United States Patent
Merchant

[15] 3,650,002
[45] Mar. 21, 1972

[54] MACHINERY FOR MAKING CRT ELECTRONIC ASSEMBLIES USING TWO INDEXING TABLES

[72] Inventor: Chester O. Merchant, Owensboro, Ky.

[73] Assignee: Kentucky Electronics Inc., Owensboro, Ky.

[22] Filed: Mar. 4, 1969

[21] Appl. No.: 804,077

[52] U.S. Cl. ......................................................29/25.19
[51] Int. Cl. ......................H01j 9/06, H01j 9/10, H01j 9/46
[58] Field of Search ................29/25.2, 25.19, 25.13, 25.14, 29/523; 72/405, 306, 419; 228/4, 5, 15, 47, 49; 214/1 BC

[56] References Cited

UNITED STATES PATENTS

| | | | |
|---|---|---|---|
| 3,130,031 | 4/1964 | McMahon, Jr. et al. | 29/25.19 X |
| 3,526,955 | 9/1970 | Cilione | 29/523 X |
| 1,801,108 | 4/1931 | Reufel et al. | 72/419 X |
| 1,947,610 | 2/1934 | McNamara | 214/1 BC |
| 1,953,492 | 4/1934 | May | 214/1 BC X |
| 2,394,700 | 2/1946 | Jorgedyk | 72/306 |
| 2,605,537 | 8/1952 | Pityo et al. | 228/15 X |
| 2,844,917 | 7/1958 | Caldwell | 214/1 BC |
| 3,047,166 | 7/1962 | Lomp et al. | 214/1 BC |
| 3,247,355 | 4/1966 | Olsen | 228/47 X |
| 3,321,606 | 5/1967 | Cropp et al. | 228/5 X |
| 3,357,621 | 12/1967 | Bodini et al. | 228/47 |
| 3,395,845 | 8/1968 | Best et al. | 228/47 X |

Primary Examiner—John F. Campbell
Assistant Examiner—Ronald J. Shore
Attorney—Laurence R. Brown

[57] ABSTRACT

Apparatus providing for automatic manufacture of a portion of an electron gun in a cathode ray tube utilizes two conjointly operated indexing tables with an intermediate transfer mechanism to assemble, fit, stake and weld in place a series of parts. At a series of indexing positions parts are loaded, checked and processed with such manufacturing steps as cutting, positioning and welding a lead tab to a cathode cylinder. The use of two tables permits high strength for staking operations, greater production in a given time, and accessible layout of equipment in a small space.

5 Claims, 27 Drawing Figures

PATENTED MAR 21 1972 3,650,002

INVENTOR
CHESTER O. MERCHANT

BY Lawrence R. Brown

ATTORNEY

*INVENTOR*
CHESTER O. MERCHANT

BY Lawrence R. Brown

*ATTORNEY*

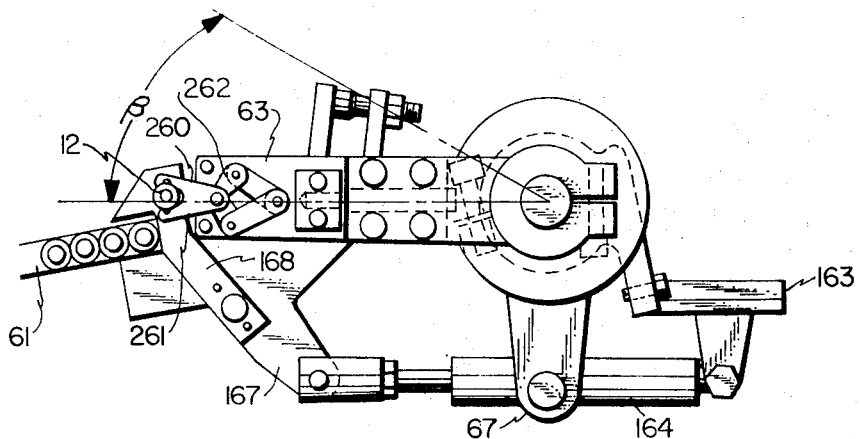
FIG. 6
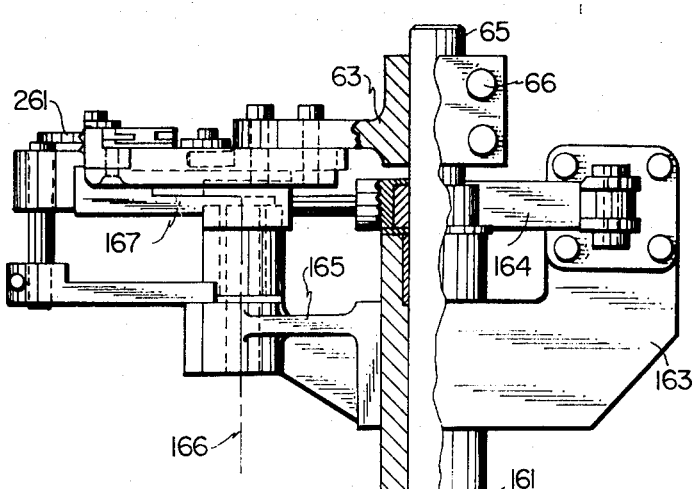
FIG. 5
INVENTOR
CHESTER O. MERCHANT
BY 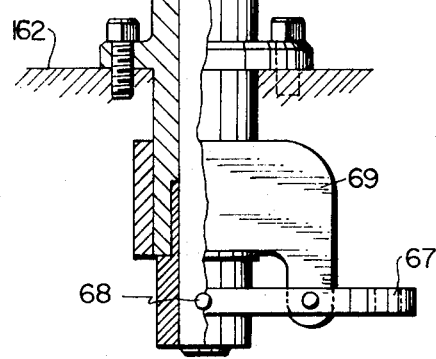
ATTORNEY

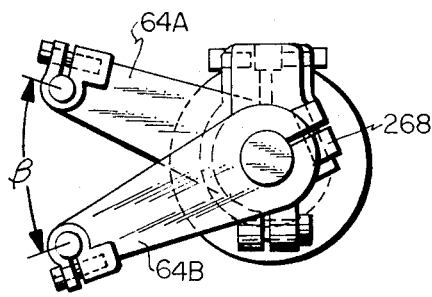
FIG. 8
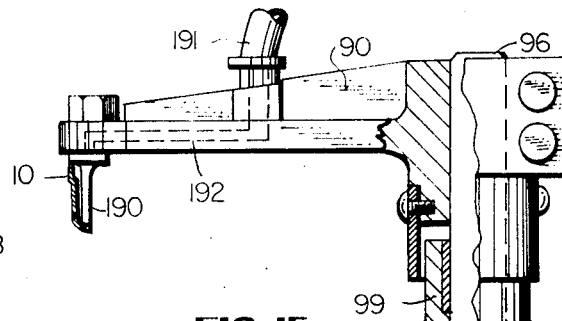
FIG. 15
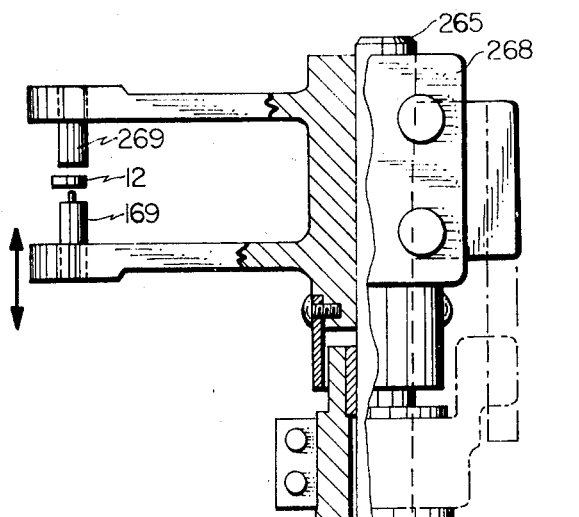
FIG. 7
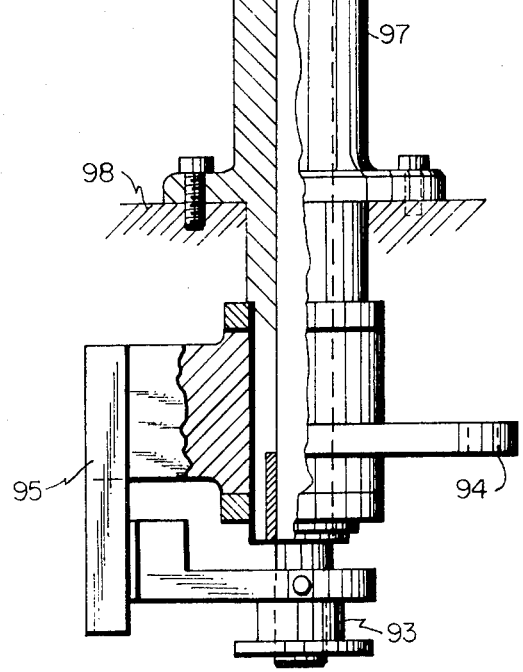
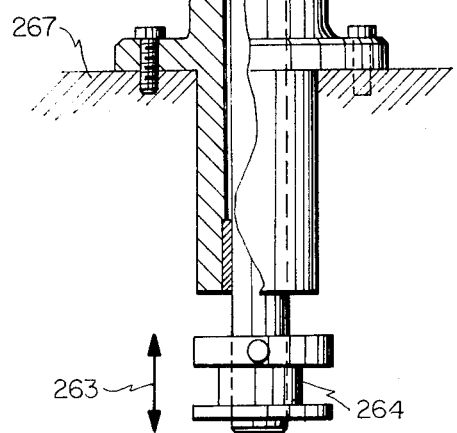

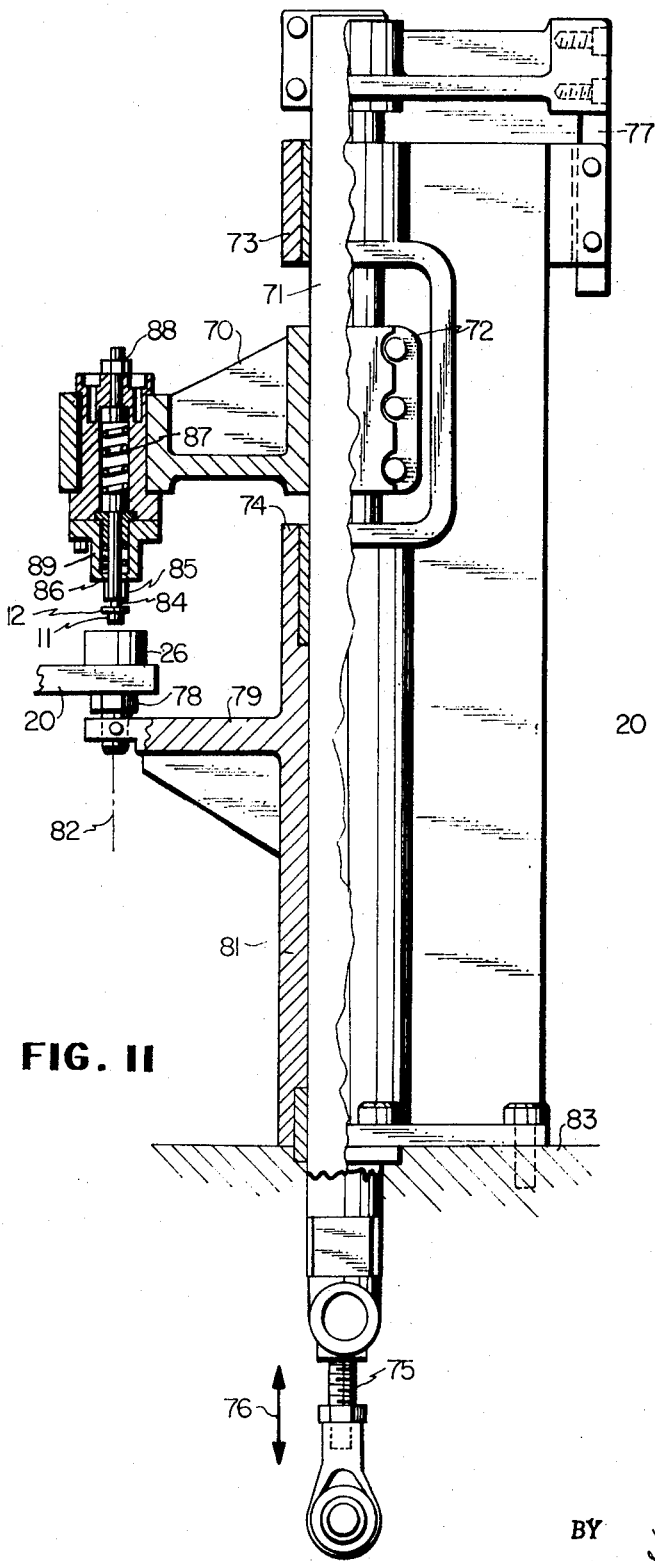

INVENTOR
CHESTER O. MERCHANT

BY Lawrence R. Brown
ATTORNEY

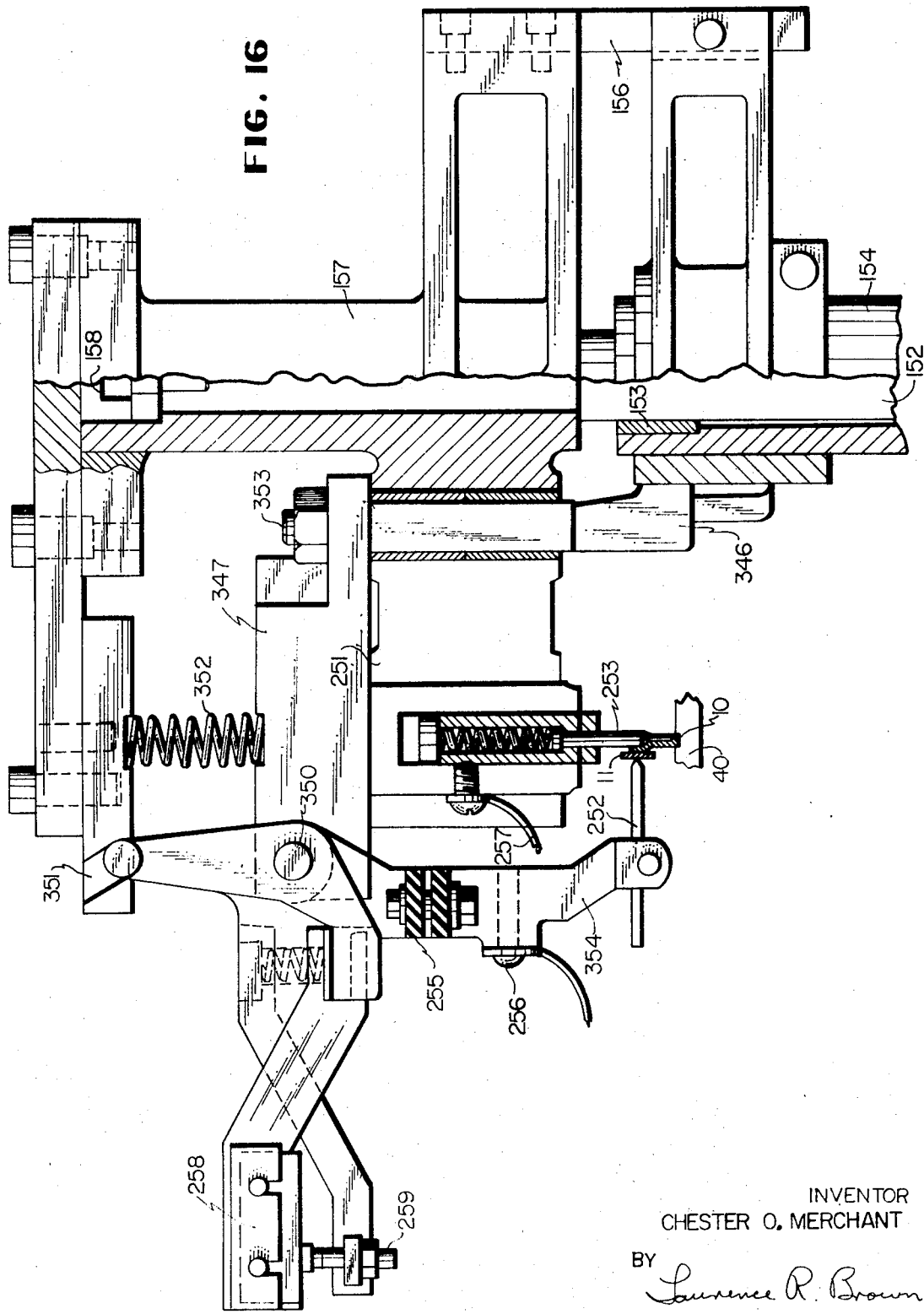

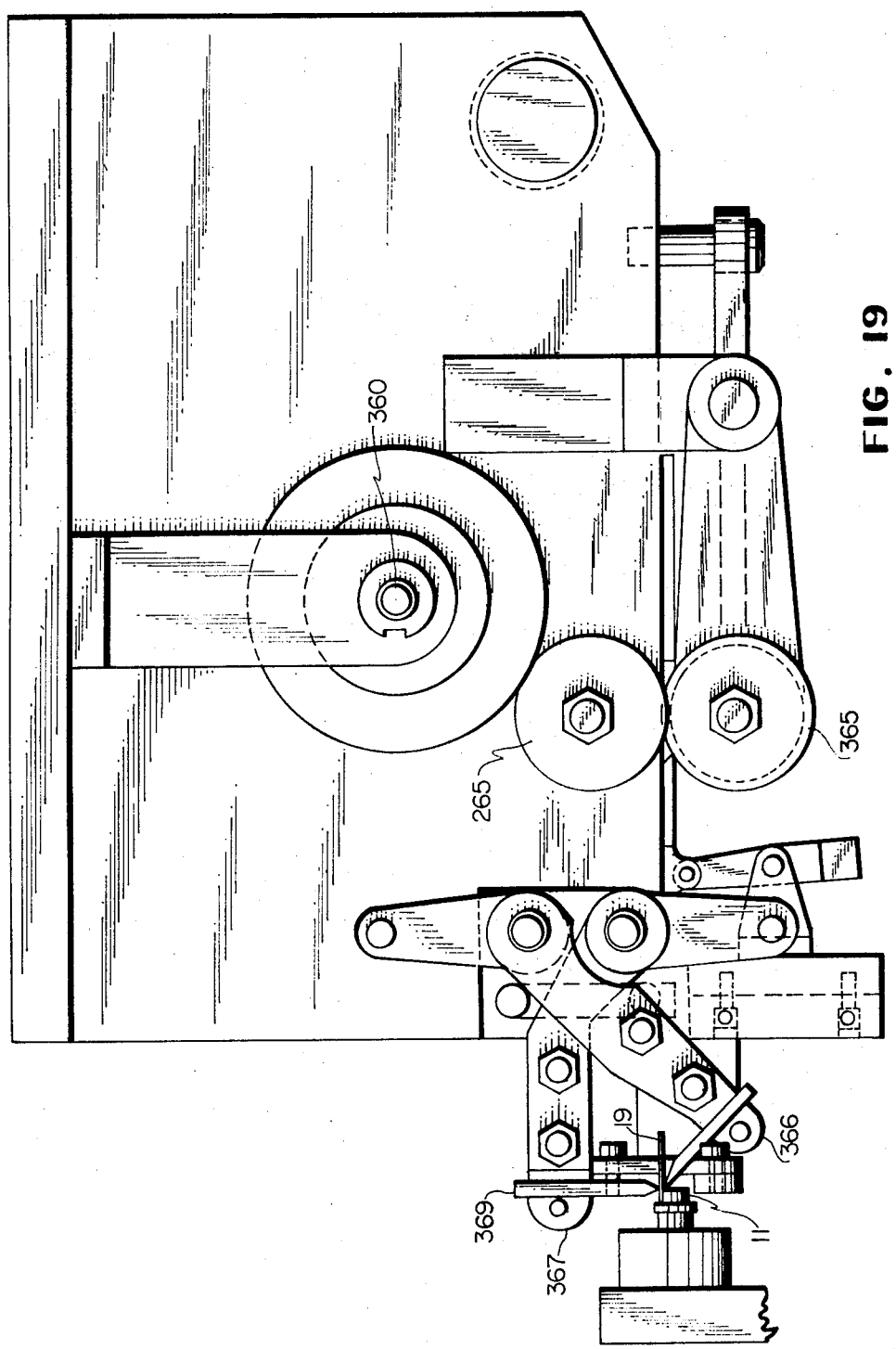

INVENTOR
CHESTER O. MERCHANT
BY
Lawrence R. Brown
ATTORNEY

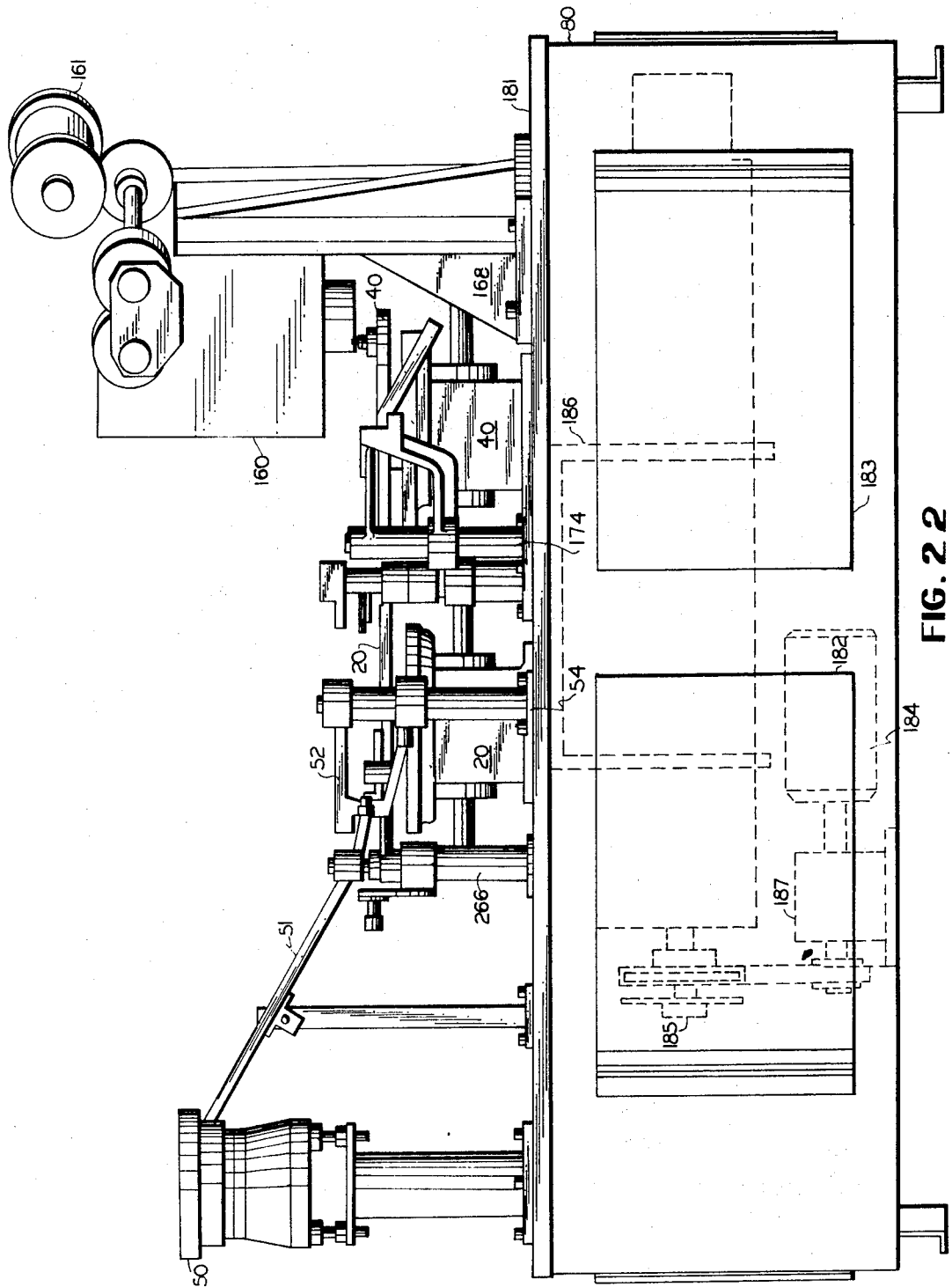

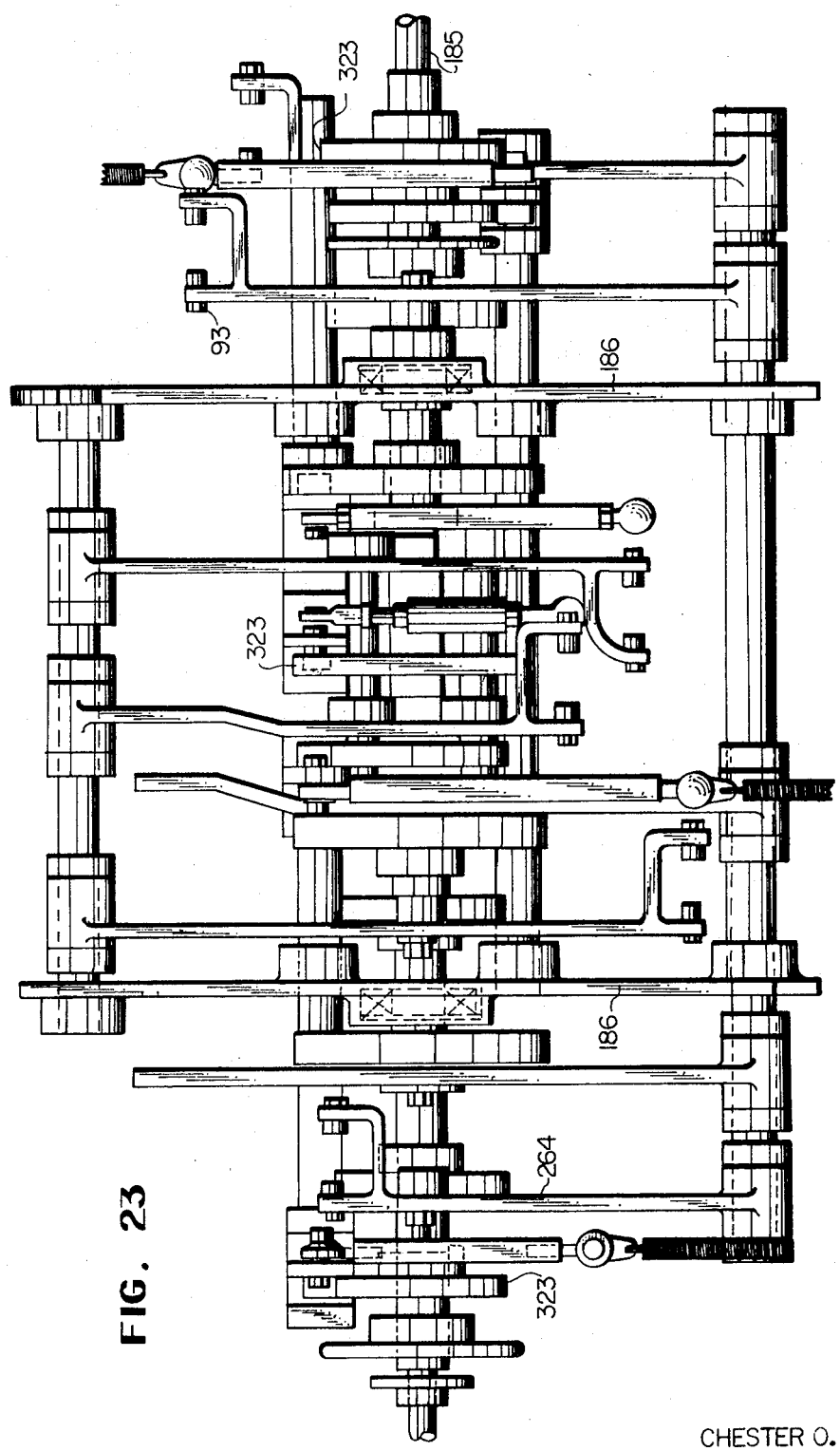

MACHINERY FOR MAKING CRT ELECTRONIC ASSEMBLIES USING TWO INDEXING TABLES

SPECIFICATION

This invention relates to automatic machinery for manufacturing electronic parts and, more particularly, it relates to machinery for manufacturing a cathode ray tube electron gun assembly having a plurality of parts precisely positioned.

Automatic machinery has been developed for assembling complex electrical assemblies such as tube sockets where a variety of parts feeding, welding and staking operations take place upon an indexing table. However, these are not suitable for the precision operations required in assembly of parts for a cathode ray tube gun, which demand critical tolerances, alignments, and lack of any burrs or scratches to prevent reject of an assembled tube costing many thousands of times the cost of the individual gun parts. The requirements for mechanical accuracy are even greater in color picture tubes, since an interrelated action in alignment and performance is required among three separate electron gun assemblies. Because cathode ray tubes operate at high voltages, critical control is necessary to avoid scratches and burrs or any other defect that might cause corona, arcing or X-ray emission. Thus, a real problem is presented in developing machinery which will be fast, accurate and gentle in its assembly of electron gun parts.

The extremely close tolerance requirements cause additional mechanical problems in the machinery, since wear, runout and sources of dimension errors must be carefully controlled. This is particularly true when many related assembly and manufacturing steps are to be accomplished in sequence in a short period of time. The nature of the finished electron gun subassembly requires that as many steps be accomplished as possible with a known orientation and co-relationship of the parts to avoid quality control variations presented by random orientation of parts when handled at intermediate steps. Thus, for example, a slight out-of-roundness from a given die or stamping operation may be tolerable if oriented in proper relationship to surrounding parts, but may result in an operational reject if oriented differently in different guns as might occur with manual transfer of partially manufactured parts from one machine to another during operation. These problems are accelerated as processing speeds increase and are particularly critical in the cathode-grid portion of the electron gun.

It is therefore a general object of this invention to provide automatic machinery for assembling parts in the manufacture of an electron gun assembly.

An object of the invention is to precisely control the location and orientation of parts in an electron gun cathode assembly.

Another object of the invention is to provide machinery overcoming the foregoing deficiencies and problems.

A further object of the invention is to provide automatic machinery for manufacturing electron gun subassemblies with high accuracies over long periods of time and at high speed.

Thus, in accordance with this invention an automatic machine is provided for manufacturing electron gun subassemblies, such as cathode mounts, by feeding a plurality of interrelated parts into position for staking, shaping and welding operations forming an integrated subassembly. The machine comprises a set of two cooperating index tables of small diameter, each with multiple stations, thereby to perform a series of operations, with relatively low peripheral speeds and high mechanical stiffness as compared to a single table of large diameter thereby being subjected to less deflection and wear in the presence of staking and welding operations. By alternately phasing operations at the two tables, high average productivity of finished parts per unit time is attained without pushing individual operations or imposing critical timing and loading effects. A set of initial parts is fed to various indexing stations located on both tables for positioning and integrating into a completed assembly, which in partly processed form is passed from one indexing table to the other in a known and controlled orientation for receiving further processing steps.

Because of the two co-related indexing table configuration a machine is produced with accessible submechanisms at each indexing position oriented to take up little overall space.

Further aspects of the invention, its merits and objectives are found throughout the following specification and accompanying drawings, wherein:

FIGS. 5 and 6 are respectively elevation and plan views, partly in section, of a ceramic disc transfer assembly;

FIGS. 7 and 8 are respectively elevation and plan views, partly in section, of a disc transfer shuttle mechanism operable with the transfer assembly of FIG. 5 to place a ceramic disc in place upon the indexing table;

Figure 10:
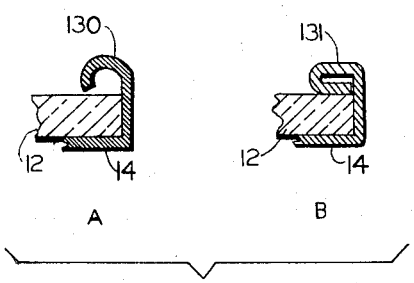
Figure 14:
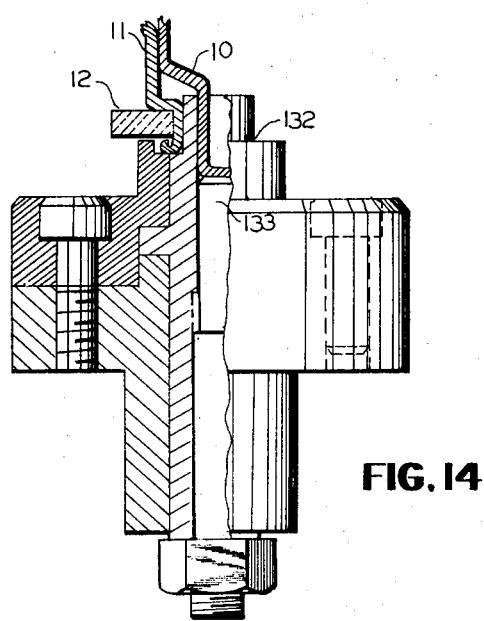
Figure 13:
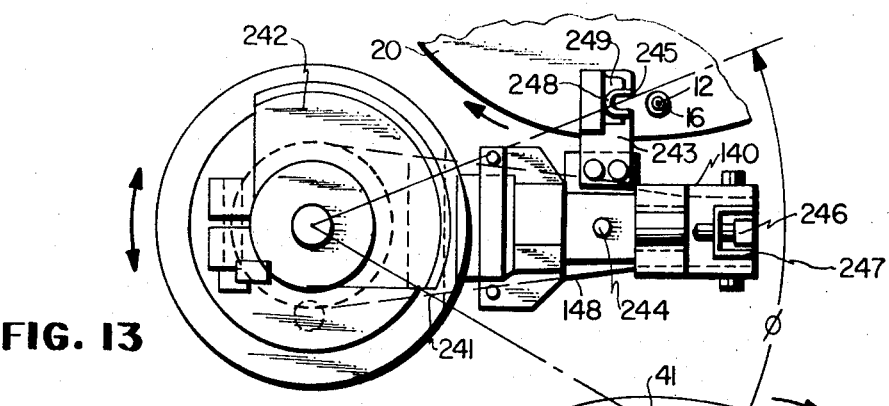
Figure 12:
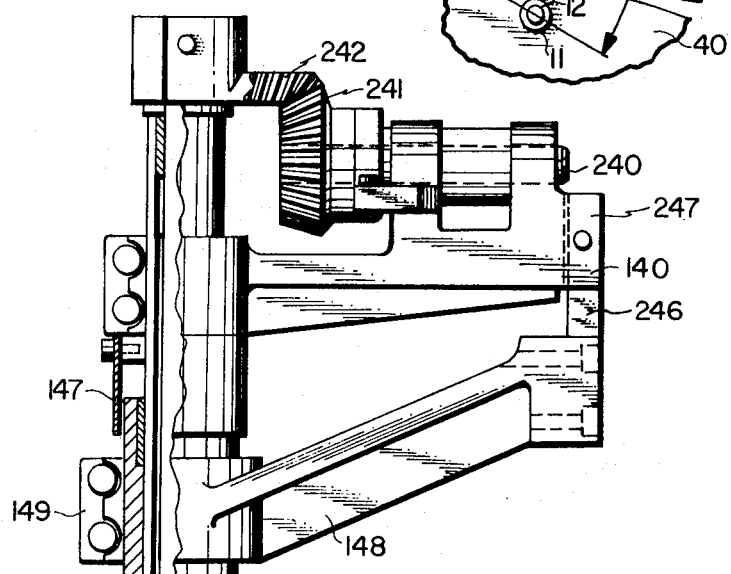
Figure 17:
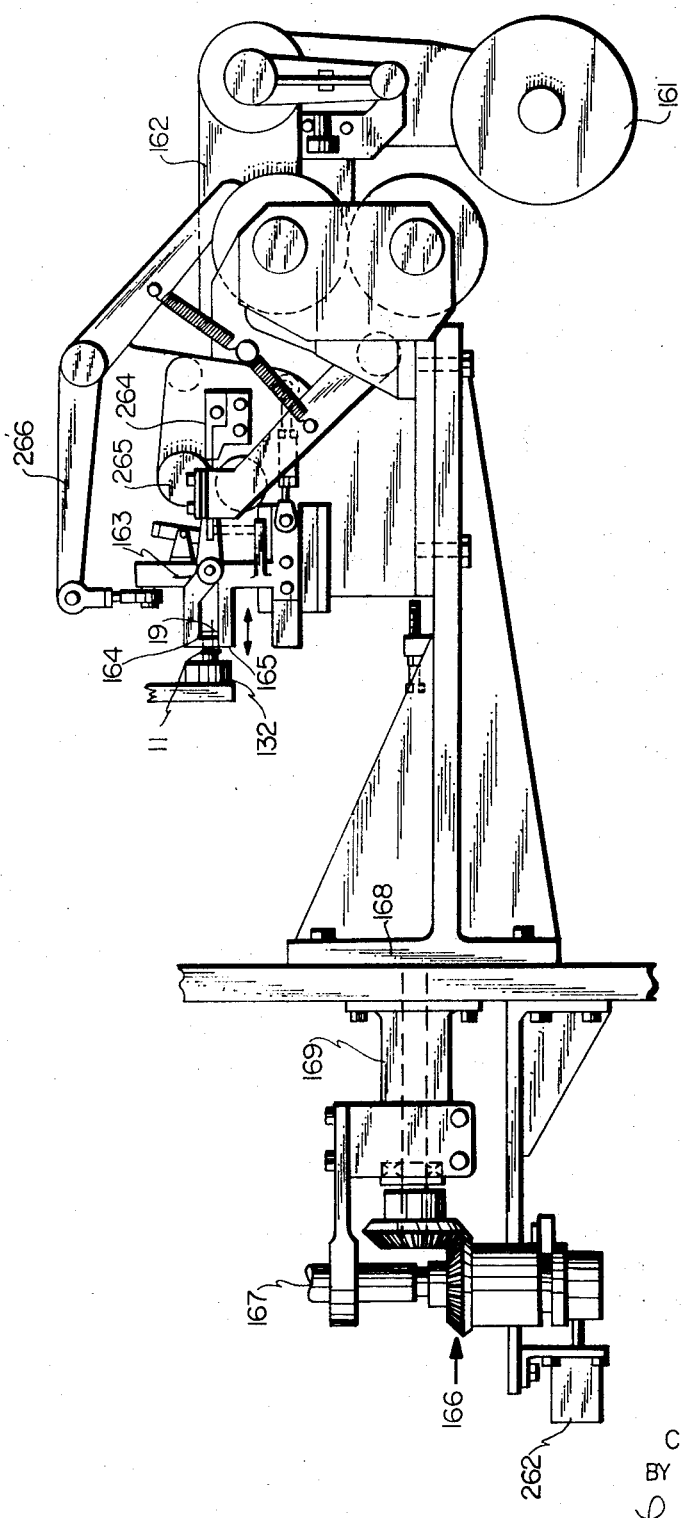
Figure 18:
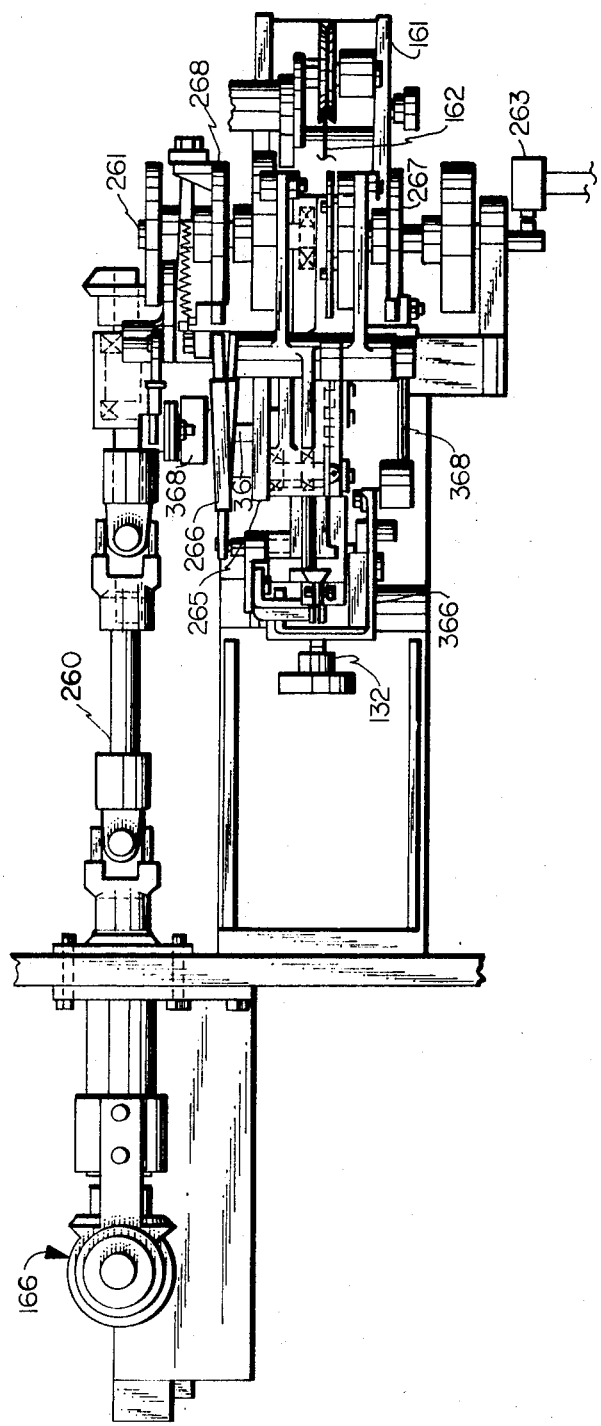
Figure 21:
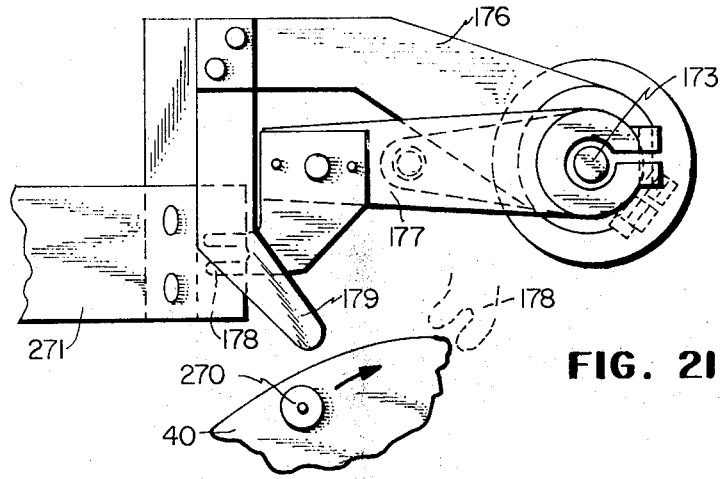
Figure 20:
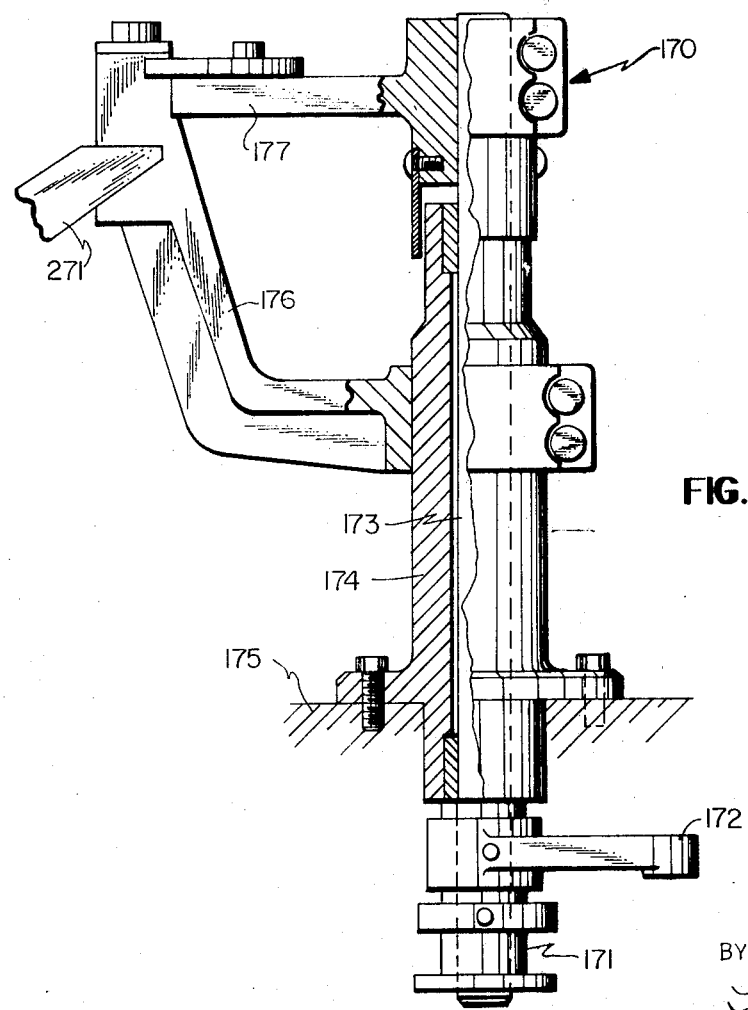
Figure 24:
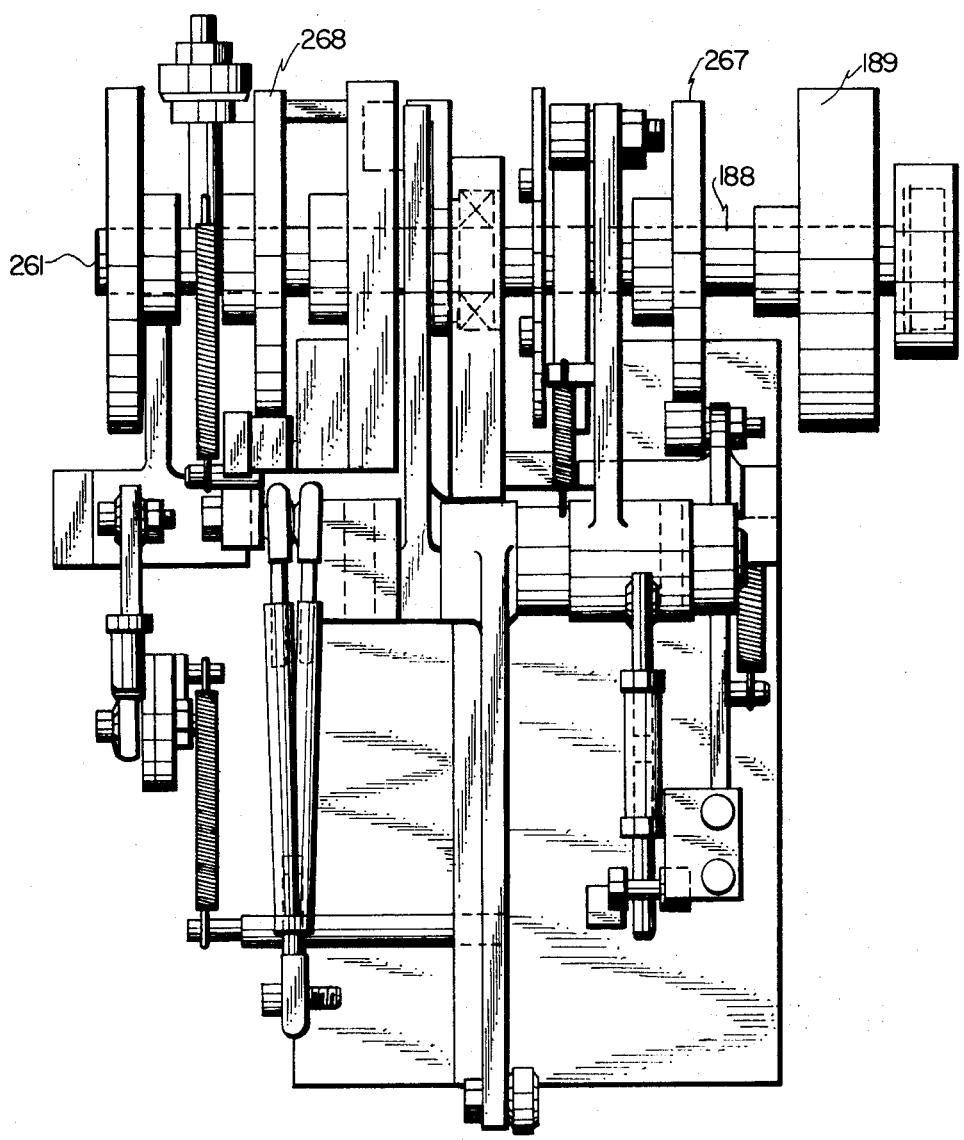
Figure 25:
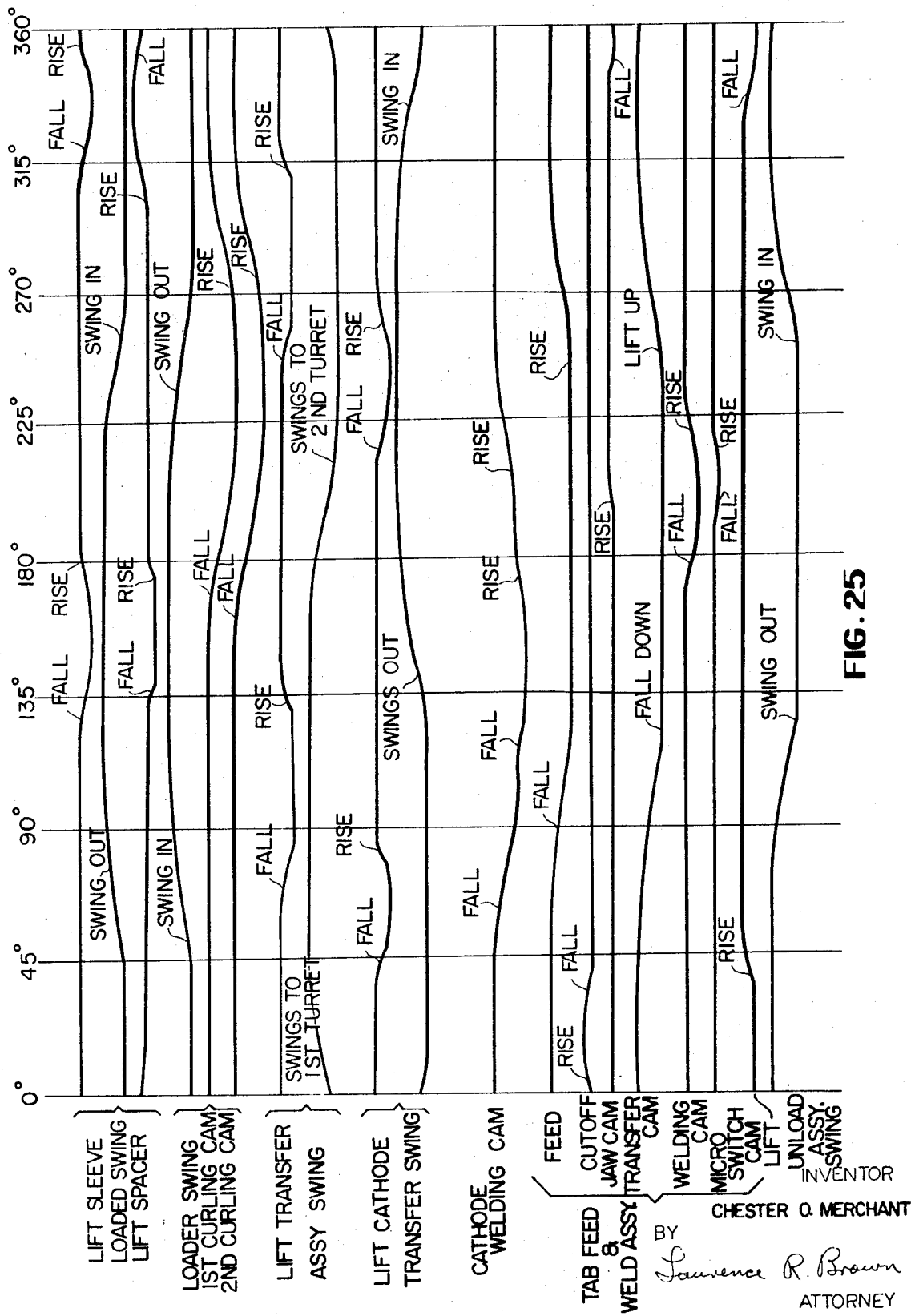
Figure 26:
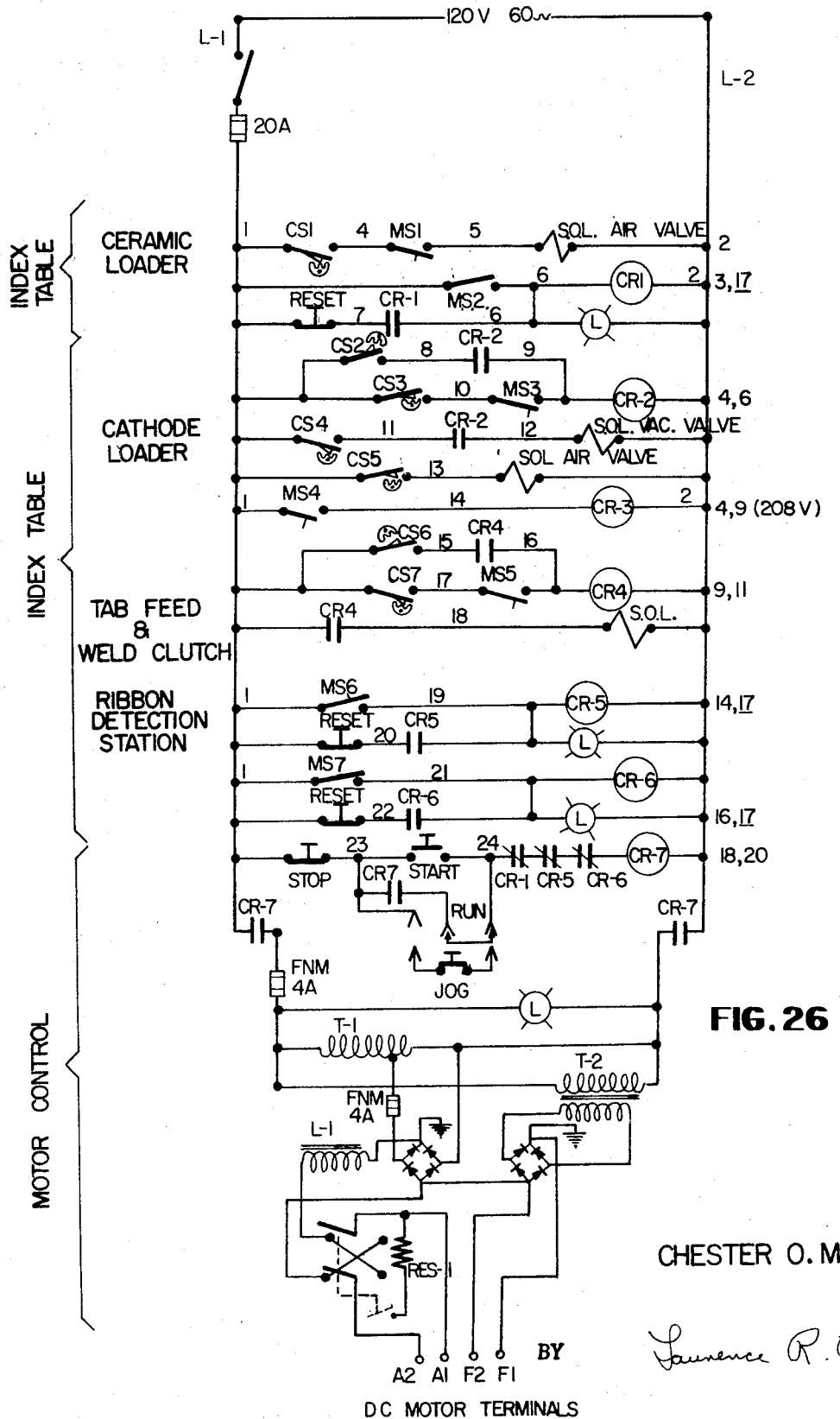

FIGS. 10 A and B are fragmental section views of a partially staked ceramic disc assembly at different stages of manufacture;

FIG. 11 is an elevation view, partly in section, of a staking punch unit for affixing a ceramic disc upon a cathode sleeve;

FIGS. 12 and 13 are respectively elevation and plan views, partly in section, of a mechanism for transferring a partly manufactured part from a fixture assembly on one index table to another;

FIG. 14 is an elevation view, partly in section, of a fragmental view of the fixture assembly fitting into the second indexing table;

FIG. 15 is an elevation view, partly in section, of the mechanism for loading a cathode tube 10 into a partially manufactured part on the second indexing table;

FIG. 16 is an elevation view, partly in section, of a welding mechanism operable to weld assembled parts together;

FIGS. 17 and 18 are respectively elevation and plan views of a ribbon tab feed assembly;

FIG. 19 is an elevation view of a tab welding assembly;

FIG. 20 is an elevation view, partly in section, and FIG. 21 a plan view of a mechanism removing an assembled part from the indexing table;

FIG. 22 is an elevation view of the assembled machinery in a bench arrangement;

FIG. 23 is a plan view of a camshaft arrangement directing operation sequences of the various mechanisms;

FIG. 24 is a plan view of a supplementary camshaft arrangement for the tab feed mechanism;

FIG. 25 is a cam timing chart showing relative operation times for each of the mechanisms;

FIG. 26 is a schematic circuit diagram of a control circuit for operating the machinery described herein; and FIG. 27 is a timing diagram for electrical switches driven from the main camshaft.

Figure 1:
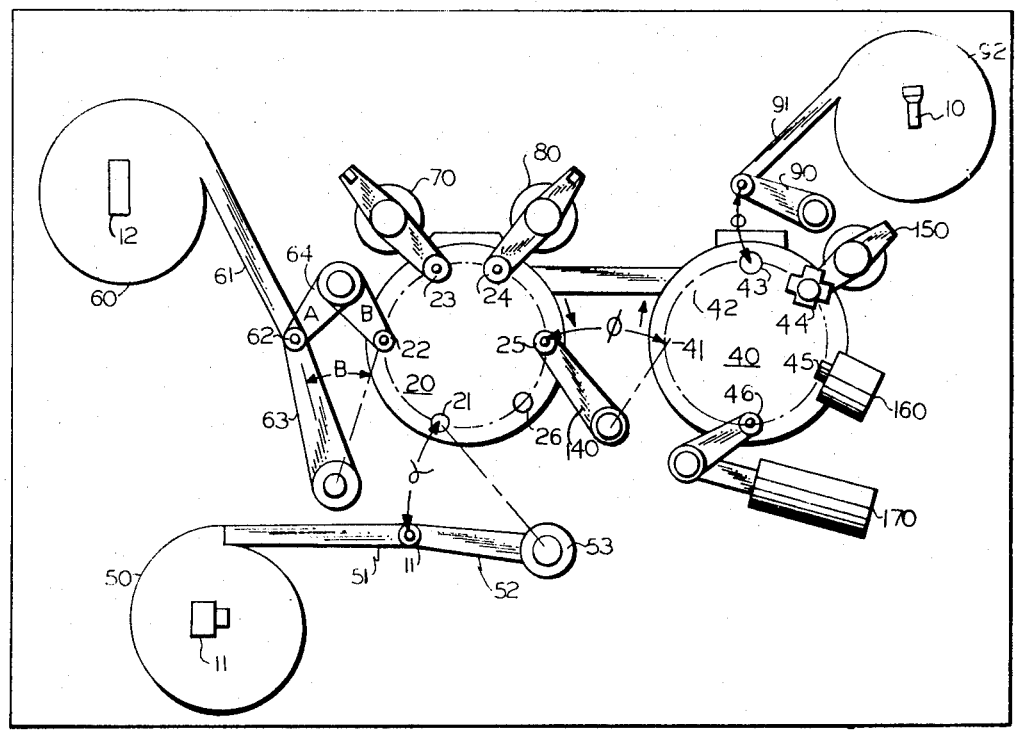
FIG. 1 is a plan view sketch of the overall indexing table assembly of the automatic machine as adapted in the illustrated embodiment for manufacture of cathodes.
Figure 2:
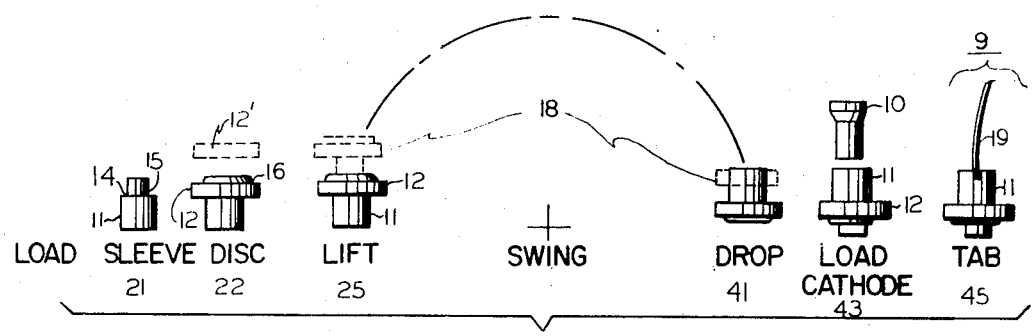
FIG. 2 is a flow chart diagram of the operational steps performed in this embodiment in the manufacture of a cathode assembly.

The general operation is referenced to FIGS. 1 and 2 showing the machinery layout and the functional flow chart for operation. The cathode ray tube electron gun is manufactured by the automatic machinery embodiment described. This cathode comprises a set of pre-manufactured parts including the closed end cathode cup 10, and an intermediate mounting shield or sleeve 11 between it and a ceramic disc 12. A shoulder 14 is provided on the sleeve 11 for holding the ceramic disc 12 in place about the neck 15 after it is dropped into position from the phantom position 12' shown. The neck is rolled over to provide a clamp 16 holding the ceramic disc in place. The operations just described take place on a first index table mechanism 20.

The partially completed subassembly 18 is then turned over and transferred into position on a second indexing table 40, where it is held in place for insertion of cathode cup 10, which is welded in place coaxially within sleeve 11. A tab 19 is then cut from a roll and welded onto the sleeve 11, after which the assembly is removed from the second indexing table 40. Typically, the diameter of the ceramic disc 12 is about three-eighths of an inch with the other parts proportionately dimensioned.

Each of the indexing tables 20, 40 of this embodiment have a plurality of stations for convenience in this view shown as six stations numbered 21–26 and 41–46 respectively in the order of their processing a cathode mount from its initial part insertion to the removal of the completed cathode mount subassembly 9. The tables are commonly driven in synchronism to rotate, index and halt for an operation at a speed of the order of 1 cycle per second, which therefore produces a completed subassembly each second at the final discharge station.

Figure 9:
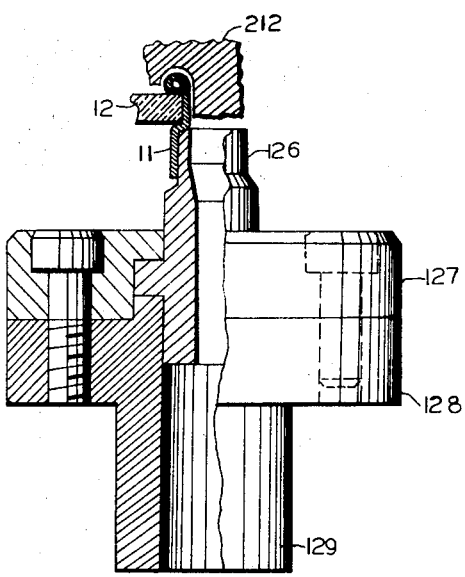
FIG. 9 is an elevation view, partly in section, of a fixture assembly for fitting into the first indexing table.

At station or position 21 on the indexing table 20, sleeves 11 are loaded to slip over a fixture assembly located at station 21, the details of which may be observed in FIG. 9. The sleeves 11 are fed by means such as an orienting vibrator bin 50 into a slide chute 51 orienting the sleeves into a limiting position where pivoting arm 52 grasps and moves them into place to drop on to the fixture assembly at station 21. This part of a particular mechanism is shown in detail in FIGS. 3 and 4.

At a further time in the cycle, the indexing table 20 moves the part 11 into position at indexing station 22. In this position a ceramic disc is moved from bin 60 down cute 61 to the position 62, where it is transported by means of the rotating, lifting and lowering shuttle mechanisms 63, 64 to station 22.

From this position the indexing table moves the sleeve 11 with disc 12 resting on shoulder 14 on to station 23 where staking tool 70 operates to give a first bend or curl to the lip 15. Thereafter at station 24 a second bend is given to complete the roll-over clamp 16. The fixture assembly is shown in FIG. 9, the two steps of bending the sleeve 12 in FIG. 10, and the staking stations in FIG. 11. In FIG. 9 it is shown that the anvil 126 which is affixed to the holder clamps 127, 128 fits into registration holes in the indexing table by posts 129. The anvil is hollow as shown, and provides for the sleeve 11 and disc 12 to rest thereover.

At the first curling station 23 the sleeve 11 is rolled over as shown in FIG. 10A by an appropriate die 212 drawn in place over the anvil of FIG. 9. At the next station 24, a further curling die is moved to bend the lip 130 under while the top of the loop 131 is pushed down to provide a clamp that is resilient giving a spring action in holding the shoulder 14 tightly against disc 12, as shown in FIG. 10B, without putting enough pressure upon the thin, fragile, ceramic disc 12 to crack it. The operation of the bending at stations 23 and 24 is later described along with FIG. 11.

At this stage of manufacture there may be certain scratches or dimples introduced from the tools which can be oriented for location in the finished part to avoid rejects, but which if randomly oriented, could introduce in some cases enough cumulative tolerance variations to cause occasional reject of an expensive completed color picture tube. Thus, while it is possible to transport parts manually from one fixture assembly station to the next, it is preferable to retain full control of orientation and provide for a mechanical transfer even between the two indexing tables 20, 40 as shown by transfer mechanism 140. This serves to lift, turn and lower the staked sleeve-disc assembly 11–12 at station 41 onto a fixture assembly on the second indexing table 40. The transfer mechanism 140 is described later in connection with FIGS. 12 and 13.

After transfer of the part between tables, a detector may be used at station 42 to assure that a part is in proper position before further steps are taken. Responsive to a detection signal that a part is not in place, the machine may be halted or one or more of the succeeding operations may be eliminated by means of programmed clutches or the like. Each table may be indexed to twelve different positions with a check station between each of six operational stations such as numbered on FIG. 1, if desired. At station 43, the cathode cylinder 10 is loaded inside sleeve 11 in which it fits frictionally with a sliding fit to be disposed to extend the appropriate distance from the ceramic disc to establish proper grid spacing. Thus, cathode cylinders 10 are fed closed end down (FIG. 2) in chute 91 from bin 92 to be transferred by arm 90 to the index station 43 where they are inserted into the sleeves 11. In table 40, the fixture assembly is similar to that hereinbefore described except that a different anvil 132 as shown in FIG. 14 is adapted to receive the parts after being inverted onto the second indexing table 40. The spacing of the cathode is determined by the limiting stop member 133. As shown in FIG. 15, the part is held by suction while being transferred into position by movable lever arm 90 traversing over the designated angle as shown in FIG. 1.

After the cathode 10 is inserted and positioned within sleeve 11, the assembly is moved into station 44, where the cathode 10 is welded to the sleeve 11 in an exactly predetermined position by four welded spots positioned about the periphery. The welding assembly 150 is shown in FIG. 16, which is described hereinafter.

For the application of tab 19, feeder and welder assembly 160 is provided at station 45. FIGS. 17 and 18 relate to the tab feed assembly and the welder assembly is shown in and described in connection with FIG. 19.

The terminal station 46 serves as a discharge station where mechanism 170 removes the manufactured assembly from indexing table 40. This mechanism is shown in FIGS. 20 and 21. Each mechanism used in manufacturing a cathode assembly is described separately, but it is to be understood that the manufacturing stations or their number may be altered to provide different or supplemental operations, and that different electronic parts or cathode structures may be made by similar operations without necessarily departing from novel principles afforded by this invention.

Figure 4:
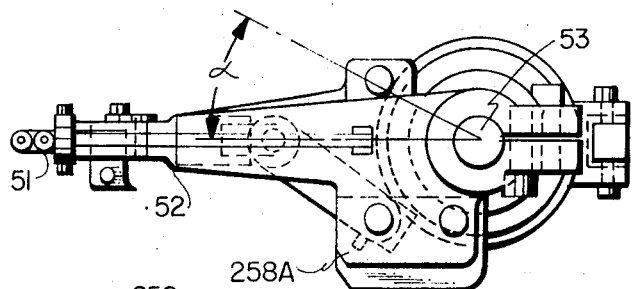
FIGS. 3 and 4 are respectively elevation and plan views, partly in section, of a transfer mechanism for placing a part on the indexing table.
Figure 3:
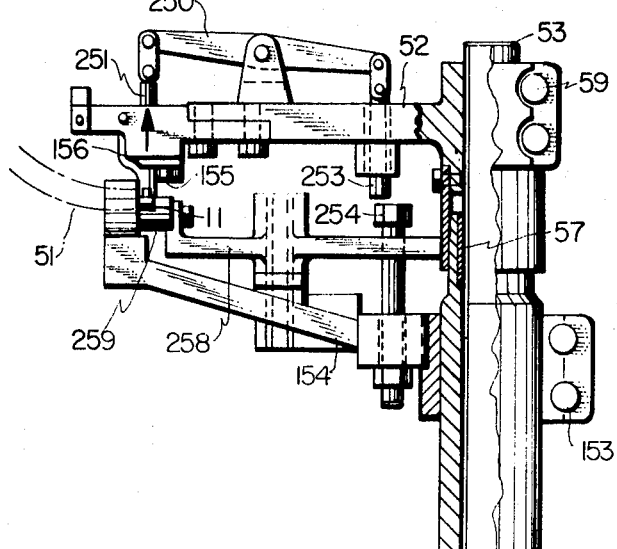

As may be seen from FIGS. 3 and 4, the transfer mechanism removes a part 11 from the end of feed chute 51 and places it onto the first indexing table for processing. The mechanism operates in a rotate and lift mode at a time synchronized to meet a station in the indexing table in response to instructions received from a set of timing cams to be described later. Thus, the previously described pivot arm 52 rotates about an angle $\alpha$ (FIG. 1) with shaft 53 to which it is clamped by bolts 59. The shaft is rotated by a lever arm cam arrangement coupled to rotating arm 54. As this arm is rotated about bearings 152, the extension slide 156 contacts arm 157 and rotates it and the shaft 53 affixed by pin 151.

The shaft is raised and lowered along slide 156 as indicated by arrow 158 by cam lever rollers riding in a groove within the collar 255, which pushes the shaft up and down by force of gravity downward, in bearings 56 and 57 to oscillate within housing 58. The entire assembly may be mounted on a bench 159.

The mechanism undergoes a cyclic operation of grasping a part 11 from chute 51, lifting the arm 52 over the index table, lowering the shaft to discharge the part on the index table over an anvil 126, lifting and returning to grasp another part.

A guide arm 154 is attached to housing 58 by screws 153 and serves to support track end 51 and pivoted arm 258 to which is attached sleeve locator block 259. The position of the pivoted arm is dictated by a cam 258A. Thus the sleeve locator block is positioned in front of track end 51 during the period when arm 52 is rotated clockwise to lead part 11. When arm is rotated counterclockwise sleeve locator block is moved clockwise to permit jaws 155 and 156 to engage and lift part 11 without interference by parts in track end 51 and the preceding chute.

Rocker arm 250 disposes a plunger 251 which pushes part 11 from the frictional grasp as the arm 52 is moved downward over the indexing table and shaft 253 registers with adjustable bolt head 254 upon reciprocation of the shaft 53. This permits the part 11 to be placed upon an anvil 26 located at the initial station 21 of the first indexing table 20 (FIG. 1) so that further manufacturing steps take place automatically, the next occurring at station 22 where a ceramic disc is placed on the shoulder 14 of the sleeve 11.

The transport mechanism for putting the ceramic disc 12 in place on the indexing table is shown in part in FIGS. 5 and 6. A pivotable arm 63 is coupled to shaft 65 by means of bolts 66 to rotate therewith as a timing cam operates a lever linkage (not shown) coupled to pivot arm 67, which is pinned to shaft 65 at 68. A stop bracket assembly 69 assures proper rotation of the shaft within housing 161, which is affixed to a bench 162.

Extending from housing 161 is a mounting bracket 163 for an air cylinder 164. The bracket 163 has an opposite arm 165 providing a pivot axis 166, about which a shuttle mechanism is rotated by the air cylinder 164. This shuttle has a pusher arm 168, which operates at a time air is applied to cylinder 164, to push a ceramic disc 12 from chute 61 into position for grasping by jaws 260, 261. These jaws are cam operated about pivot point 262 to open and close with movement of the shuttle plate. Working in conjunction with this rotatable arm 63 is the lifting mechanism 64 shown in FIGS. 7 and 8. This operates in the lift mode as indicated by arrow 263 from cam lever rollers riding in grooved collar 264 on shaft 265 which is contained within housing 266. The housing may be mounted at bench level 267.

A pair of extending arms 64A and 64B are affixed to the shaft 265 to raise the disc 12 into place into jaws and to lower it into place onto the sleeve 11. The disc is shown in place at the level of jaws 260 and 261 of FIG. 6, where this mechanism normally resides during the time arm 63 is rotated. Arm 64A by means of pin 169 serves to lift the disc from shuttle mechanism 168 into jaws 260, 261 before rotation of arm 63, as the shaft 265 moves upward in its initial portion of the transfer cycle. Shaft 265 then moves downward allowing disc 12 to clear pin 169. At the end portion of the transfer cycle the remaining arm 64B serves by means of post 269 to move downward with shaft 265 and push the disc 12 out of jaws 260, 261 into place upon sleeve 11.

As this ceramic disc 12 rides upon shoulder 14 of sleeve 11, it is in place on the anvil 126 shown in FIG. 9 and rides to index stations 23 and 24 on the indexing table 20 (FIG. 1), where the sleeve material is rolled over to stake the ceramic disc in place. Both parts of this staking operation are accomplished by means of similar mechanisms such as shown in FIG. 11, which in FIG. 1 are identified as staking tools 70 and 80.

The staking tool fixture 70 is affixed to shaft 71 by clamps 72 for raising and lowering within limits not exceeding housing limits 73, 74 as programmed by a cam and link 75, operating to reciprocate as shown by arrow 76. A bracket-slide mechanism 77 keeps shaft 71 from rotating while permitting axial motion.

It is noted that for a staking operation or any other sort requiring a significant load, the double turret indexing feature of this invention becomes important. Thus, indexing table 20 has a small diameter this being stiff and giving a short lever arm from the outer periphery to the pivot shaft to afford rugged construction and long life at low cost. The anvil 126 (FIG. 9) fits against a base 78 on brace 79, which extends from housing 81, serving to further support index table 20 to prevent damage to its bearings and to bear the force of the staking operation along the axis 82. The housing 81 may be mounted on a bench at 83.

A curling tool has a central post 84 extending into the hollow fixture (FIG. 9) inside sleeve 11 and ceramic disc 12 and the punch portion 85 then serves to roll the lip of the sleeve 11. A stripper 86 extends to permit retraction of the die without lifting the sleeve 11 from its place on the anvil. As the entire arm 70 is pulled down, the heavy spring 87, adjusted by nut 88 to proper force, lets punch 85 contact and curl the lip on sleeve 11 against the force of spring 87. Lighter spring 89 lets the stripper 86 recede until the end of the downward motion of the arm 70 is reached. Then punch 85 reaches the position shown during the retraction motion of arm 70, and the stripper 86 reaches its shown position by means of spring 89. This leaves the staked assembly in place for the next operation. Punches 85 are shaped as necessary to achieve the two successive operations shown in FIG. 10.

The manufacturing operations are now transferred from the first indexing table 20 to the next 40 by means of the transfer and rollover mechanism 140 (FIG. 1). This mechanism shown in FIGS. 12 and 13, operates in a lift and rotate mode by means of timed cam operations for lifting in collar 141 and for rotation at lever arm 142. Whenever any great angle of rotation is used such as 90° for this mechanism, a long lever rod (not shown) can be affixed to the lever arm 142 to absorb the arc movement encountered. The housing 143 is affixed at bench level 144 to permit the shaft 145 to move up and down within bearings 146, 147.

The movement of the assembled parts 11, 12, 16 through the angle $\phi$ (FIG. 1) is accomplished with the projection arm 148 stationary and affixed to housing 143 by clamps 149, etc. A shaft 240 is provided for rotation by gear 241 pinned to it as the shaft 345 rotates rack gear 242, which rotates through an arc of about 90°. The gear ratio provides for 180° movement of the pinion gear 241 as the shaft is rotated through its desired angle such as 90°. This causes a rotation of the part rack 243 affixed to shaft 240 at pin 244 over 180° to pick up the part from station 25 on index table 20 and place the part upside down at the new station 41 on the second index table 40.

In order to register the pocket 245 with the part, various guides 246, 247 are provided. The pocket 245 provides a ledge 248 upon which the ceramic disc 12 rides and a jaw 249 lightly spring loaded to grasp and hold the part when it comes to rest at the indexing station 25 of table 20.

The mechanism 90 for transporting the cathode tubing 10 into place in the partially manufactured assembly on the second indexing table is shown in FIG. 15. This mechanism operates in a swing and lift mode by way of a lift cam operating a lever with rollers in lever 93 on the shaft 96, and a swing cam lever at a lever arm 94. A slide mechanism 95 is provided to hold alignment of the shaft 96 at the swing position identified by lever 94 as the lift cycle takes place. The housing 97 is affixed at bench level 98 to permit the shaft to rotate and slide in bearings 99, etc.

In operation, the picker plunger 190 is inserted into a cathode 10 at the end of the feed track by the lift-lower motion of the shaft 96, and the cathode is retained by means of air line 191 which is operated to hold the cathode 10 in place by suction through the intermediate air passageway 192. The air line suction is such that it will pick up the cathode 10 and carry its weight, but when the shaft 96 lowers so that the plunger 190 friction forces the cathode 10 inside the sleeve 11, the suction grip is broken and air pressure applied as the shaft 96 is raised and returned for another pickup operation. If desired, the air supply may be programmed by appropriate valves operated by timing cams.

With the cathode in place the assembly moves into station 44 for a welding operation by welder mechanism 150 which is shown in FIG. 16. This mechanism operates only in the lift mode by cam action at the end of shaft 152 sliding it upon bearings 153 within housing 154 affixed to a bench at an appropriate level (not shown). The slide 156 affixed to moving cap 157 prevents twisting or misalignment. The cap 157 is affixed to shaft 152 by means of bolt 158, so that the mechanism moves up and down.

Welding is accomplished at three or four radially disposed stations which operate simultaneously, one of which is shown. This mechanism serves to insert welding electrode 253 into a cathode 10 on index table 40 so that the welding rod 252 may radially move into contact with sleeve 11 and weld it to cathode 10. Electrical insulation member 255 is used so that connector leads 256, 257 can be connected to a source of welding energy not shown. The welding is timed by means of microswitch 258 with normally open contacts, which backs away from adjustable stop 259 at the proper time to spot weld the parts together. By holding the microswitch 258 off the stop 259 for operation of the welding cycle, there is no possibility of wear or machinery malfunction to damage the switch. The microswitch lever arm pivots about pin 350 and is cammed in slot 351, as the cap 157 is raised and lowered. Stop bracket 346 is arranged to stop the downward travel of arm pivot support 347 at which point continued travel of cap 157 causes cam 351 to actuate the welding electrodes. Spring 352 biases the arm pivot support 347 against stop 251. Guide bolt 353 orients arm pivot support 347. Welding arm 354 is similarly pivoted about pin 350 by means of cam slot 351 during the welding cycle. During this welding operation the welding electrode 253 positions the cathode 10 against the turret in its precisely spaced position as before described. The assembly is then ready for moving to a last processing station for affixing the tab 19 (FIG. 2).

In FIGS. 17 and 18 are shown the mechanism for feeding from roll 161 a ribbon 162 which is cut by knife 163 into a tab 19 and gripped within jaws 164, 165, for positioning against sleeve 11 in fixture assembly 132 for welding. This mechanism is operated in connection with a single revolution clutch assembly 166 driven from shaft 167 which rests on frame 168, and is linked through shaft 169 and a shaft-gear arrangement 260 to drive operating shaft 261, which is appropriately geared and cammed to rotate reel 161 and operate the other mechanisms and a welding switch 263 in timed sequence during the single operating cycle that the clutch is programmed by solenoid 262.

The ribbon 162 is pulled through guides 264 by means of feed rollers 265 while gripper jaw 165 is moved by a cam on shaft 261 to receive and grip the ribbon after the ribbon is fed at the proper length. The lever 266 is operated by a cam 268 for cutting off the tab 19 from ribbon 162. The tab 19 is transferred to rest against sleeve 11, and the welding operation follows, as shown by FIG. 19.

A ratchet or overrunning clutch 360 with a drive stroke rotating shaft 361 clock wise to drive the tape feed roll 265 against spring loaded roll 365 for metering the length of the tab from the end of the ribbon. Cams 267, etc., operated from shaft 261 link pivoted welding arms 366 and 367 at link 368 for a squeeze welding cycle on sleeve 11 and tab 19.

Welding electrodes 369 are suitably insulated and connected to a power source (not shown) for a welding operation at a time specified by switch 263, after which the welding electrodes are removed from contact with the assembly being manufactured, and the indexing table 40 is rotated to a further discharge station.

Removal of the assembly is shown in FIGS. 20 and 21. This part removal mechanism 170 operates from the central timing cams in a swing and lift mode from lever rollers riding in a grooved collar 171 and pivot arm 172 to reciprocate and rotate shaft 173 within frame 174 attached to a bench 175. A fixed arm 176 cooperates with the movable mechanism arm 177 which has a grooved receptacle member 178 to receive a part 270 rotated into engagement by the indexing table 40. Receptacle 178 raises the part 270 out of the turret and swings the part against stripper cam 179 causing it to fall into delivery chute 271. The movable arm then returns to the indexing position on table 40 and lowers into position during the indexing of the succeeding part 270 into position in receptacle 178. This finishes the typical sequence of manufacturing operations to provide a cathode mount subassembly.

As may be seen from FIG. 22, the complete mechanism may be conveniently disposed in a bench 180 with a top plan layout similar to that shown in FIG. 1, wherein all the mechanisms about the tables are mounted on bench top 181, and the drive motor and various cams, linkages, and control mechanisms together with appropriate gear drives and indexing mechanisms such as general movements for the indexing tables 20, 40 are mounted behind panels 182, 183. The master timing cam arrangement in this figure where the motor 184 drives the cam shaft 185 through an intermediate gear arrangement 187 is shown in detail in FIG. 23. The cam arrangement is bolted to the table top by frame 186. In these master figures appropriate legends and primed reference numbers are cross referenced to mechanisms in the various views to permit comparison, and the cam surfaces 323, etc., are fashioned to relate the various operations in the manner shown by the timing chart in FIG. 25. The various angles of cam shaft 185 rotation are shown to identify the sequence of operations and the individual timing of each operation performed by the cam-lever-linkage assembly of FIG. 23.

The auxiliary view of FIG. 24 shows the cam arrangement for the tab feed mechanism in which shaft 188 is driven by gear 189 which is also synchronously timed as shown in FIG. 25. Although this teaching illustrates a workable embodiment of the invention, it is clear that not only some variations are possible, but also the mounting arrangement may be changed or the individual station operations modified in a manner consistent with the overall operation plan.

The overall operation contains further controls comprising a set of timing switches operated by the cams in connection with the control circuit of FIG. 26, as illustrated schematically by the timing diagram of FIG. 27. In these diagrams the cam switches and various contacts are identified by legends CS, relay switches and contacts by legends CR and station check switches by the legends MS.

In FIG. 26 a master line switch 426 controls power from lines $L_1$ and $L_2$. It is to be recognized that the various lines are operating simultaneously during each main cam shaft cycle, and that the cam switch closures are timed as shown in FIG. 27. This timing diagram also relates the period during which the first table 20 indexes, and moves from station to station. The two tables index alternately during the camshaft cycle. Each line from top to bottom will be discussed in sequence with the remainder that this is not a sequence of operation but a description of a series of operations taking place during each cycle of operation.

After each sleeve is loaded at the initial station, cam switch $S_1$ designates a period over which microswitch 1 operates a solenoid air valve (164 as shown in FIG. 6) to load a ceramic disc only provided the sleeve is properly loaded and in place. At the first index table only one more check is accomplished with microswitch $MS_2$ checking at the last station to see that the part is transferred to the second table. It operates relay CR–1 which holds itself until reset and lights alarm lamp L. This opens the relay contact CR–1 in the last line to remove motor power by contacts CR–7 in the motor control circuit, and thus shuts down the operation automatically in case of defective parts, jamming or other improper operation. Normally the operation is started by the start switch to operate the self-holding master relay CR–7, and is stopped by releasing power to the relay by stopswitch. The machine may be jogged by a switch control connected in the manner shown in place of run connection.

Several controls are located on the second indexing table, starting with microswitch $MS_3$ which checks to make sure a part is properly transferred from the first indexing table. If a part is properly in place, cam switches $CS_2$ and $CS_3$ control the timing of operation and release of relay CR–2, which in turn operates a solenoid vacuum valve at a period controlled by cam switch $CS_4$ to pick up a cathode. Cam switch $CS_5$ can be used with solenoid air valve 2 to apply the air pressure as the cathode is put in place, and $CS_4$ releases the solenoid vacuum valve.

Microswitch $MS_5$ detects the proper condition of an assembly before the tab feed and weld station to actuate relay CR–4 at appropriate time determined by cam switch CS–7 and operate the clutch solenoid. This condition is held by the self-holding contacts until cam switch CS–6 releases the relay CR–4.

Microswitch $MS_6$ detects the presence of the ribbon for the tab and serves to shut down the motor by relay CR–5 if no ribbon is present. An indicator lamp and reset switch operate in the same manner as previously described to open and reactuate the motor relay circuit. Similarly, microswitch MS–7 detects the presence of a faulty part at the last station on the second table to cause the shut down procedure by means of relay CR–6.

Accordingly, the description of an operable embodiment of the invention points out various features of novelty, which are defined with particularity in the appended claims.

What is claimed is:

1. Apparatus for automatically manufacturing subassemblies for cathode ray electron tube guns including a tubular cathode electrode, comprising in combination, an indexing table arrangement of small diameter to produce a short lever arm from the outer periphery to the pivot shaft whereby high strength is provided for staking operations, little space is occupied and critical tolerances are maintained over long periods of operation, said indexing table arrangement providing near the circumference of the table a plurality of positions and means indexing the table to carry an electron gun part from position to position, mechanical means loading an apertured ceramic disc on the indexing table at one position, mechanical means locating a cathode electrode part having an open end in the form of a cylinder into the apertured ceramic disc, and staking means at a position about said indexing table rolling over said open end to contact said disc and clamp said electrode part to said disc while resident at said one position on said table.

2. Apparatus as defined in claim 1, wherein said electrode part comprises a cathode sleeve cylinder with a shoulder intermediate its ends, and means holding the shoulder against said disc while said staking means rolls over said open end.

3. Apparatus as defined in claim 1, wherein said indexing table arrangement comprises two side-by-side indexing tables and a sequence of positions starting on one table and ending on the other table each adapted to form an intermediate manufacturing step on said subassemblies.

4. Automatic machinery for manufacturing electron gun subassemblies from a set of electrode parts including ceramic and metallic parts, comprising in combination, a plurality of at least two coacting rotary indexing tables each having a multiplicity of special purpose indexing positions for processing one of said parts, at least one of said indexing positions on one table provided with impact means to shape one of said metallic parts while resting on the table, and having a table diameter small enough to produce a short lever arm from the outer periphery to the pivot shaft whereby high strength is provided for the impact operations, little space is occupied by the indexing table and critical tolerances are maintained over long periods of operation, a station adapted for receiving a first part for processing, and means indexing said part successively through a plurality of positions on each of said indexing tables, including a mechanism transferring the part from one table to the next wherein the electron gun subassemblies manufactured are cathode assemblies including a cathode cup member, and said automatic machinery includes means located at separate stations alongside said indexing tables to handle and introduce to positions on the two said tables a plurality of differing parts of said cathode assemblies.

5. Machinery as defined by claim 4, including receptacle means located at a specified station adjacent one of said tables for receiving a manufactured subassembly as the part is rotated by said table into receptacle structure comprising a grasping arm, means including an inclined plane for discharging the part from said grasping arm, and means rotating the grasping arm into contact with said inclined plane from said specified station.

* * * * *